June 2, 1970 — P. R. EKLUND — 3,515,034
CRYOGENIC REFRIGERATOR COMPRESSOR IMPROVEMENT
Filed Oct. 3, 1968 — 2 Sheets-Sheet 1
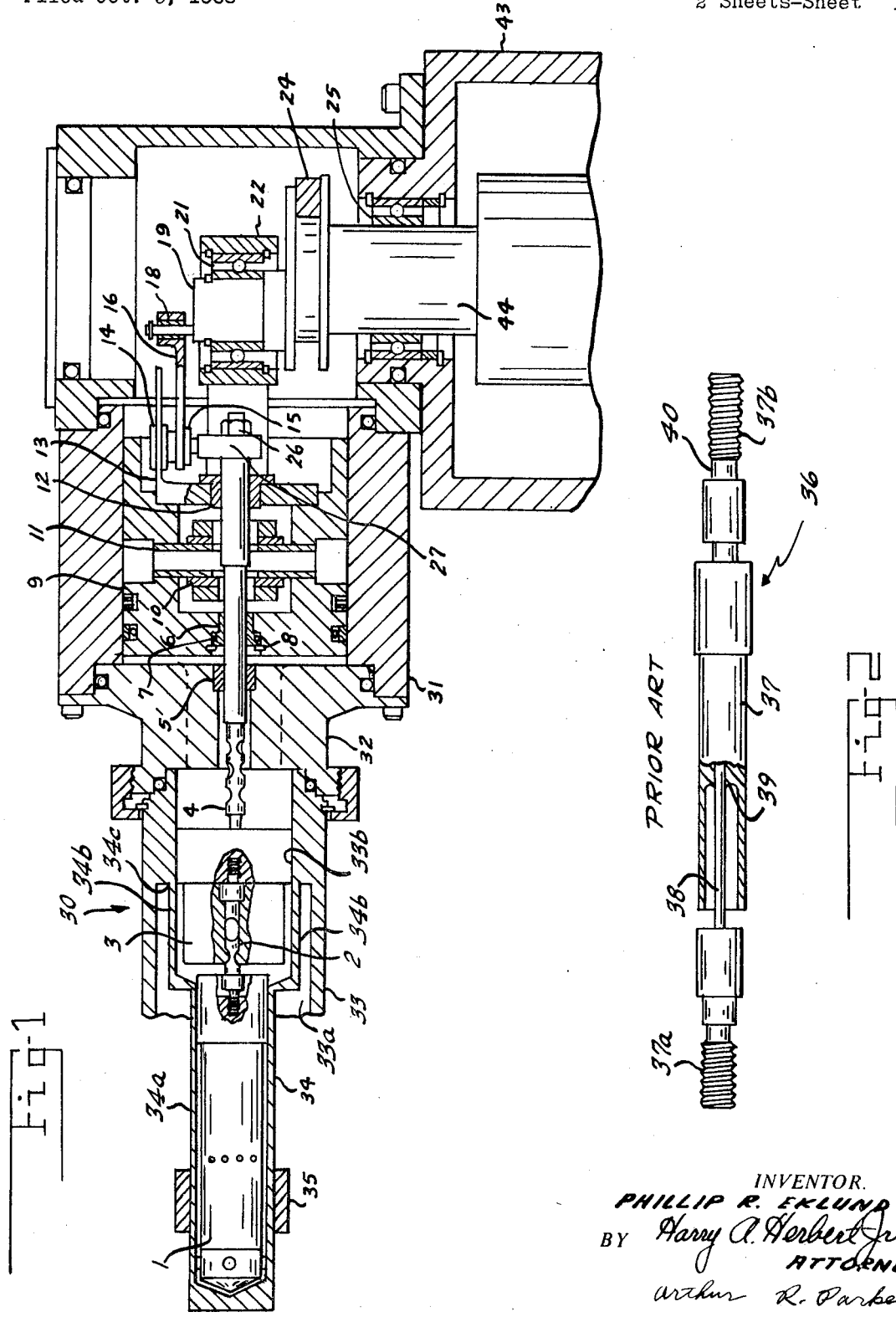
INVENTOR.
PHILLIP R. EKLUND
BY Harry A. Herbert Jr.
ATTORNEY
Arthur R. Parker
AGENT United States Patent Office 3,515,034
Patented June 2, 1970

3,515,034
CRYOGENIC REFRIGERATOR COMPRESSOR IMPROVEMENT
Phillip R. Eklund, 3339 Stanwick Drive, Dayton, Ohio 45430
Filed Oct. 3, 1968, Ser. No. 764,813
Int. Cl. F04b *39/00;* F16j *1/10;* G05g *1/00*
U.S. Cl. 92—152                                      7 Claims

ABSTRACT OF THE DISCLOSURE

A thin, stainless steel wire brazed piston rod assembly for use in a cryogenic compressor unit and having a flexure groove arrangement to thereby improve compensation to lateral misalignment, and increase the strength and therefore the resistance to fatigue failure of the said assembly.

BACKGROUND OF THE INVENTION

This invention relates generally to the field of cryogenic compressors and, in particular, to an improved piston rod assembly for use in such compressor units.

In the development of certain types of cryogenic refrigerating compressor units particularly with the miniature-type utilized in certain aircraft, one problem has involved the frequent failure of the compressor-displacer piston rod assemblies utilized therewith. A brazed-type of thin-wire assembly has been previously utilized in such piston rod assemblies to compensate for lateral misalignments occurring during assembly and/or during actual operations. In service, both the wire and other portions of the assembly have broken at frequent intervals. Further study of this problem has resulted in the development of the present invention which incorporates certain improvements and advantages, and thereby substantially eliminates or, at least reduces the foregoing problem in a unique manner, as will be hereinafter described in detail in the following summary and description thereof.

SUMMARY OF THE INVENTION

A principal object of the present invention resides, therefore, in a uniquely-designed, thin-wire, displacer piston rod assembly utilizable in a cryogenic compressor unit and incorporating improved means for compensating against lateral misalignment occurring either during the assembly and/or operation of the said compressor unit.

A further object of the invention is in the development of a new and novel thin-wire, stainless steel, piston rod assembly specifically designed for use in a miniature-type, cryogenic refrigerating compressor applicable in certain aircraft and which is improved by the incorporation therein of a flexure groove arrangement offering both equal compensation for lateral misalignment and, at the same time, greatly increasing the strength, reliability and operating life capabilities of the said assembly.

Other objects and advantages of the invention will appear from the following disclosure of the invention, in which:

BRIEF DESCRIPTION OF THE DRAWING

FIG. 1 represents an overall cross-sectional view, partly schematic and broken-away, of the improved compressor unit in which is incorporated the novel arrangement of the present invention;

FIG. 2 is a second partly schematic view of a previously-developed form of displacer rod utilizable with the compressor of FIG. 1 before the present invention has been applied thereto;

DESCRIPTION OF THE PREFEREED EMBODIMENT

Figure 3:
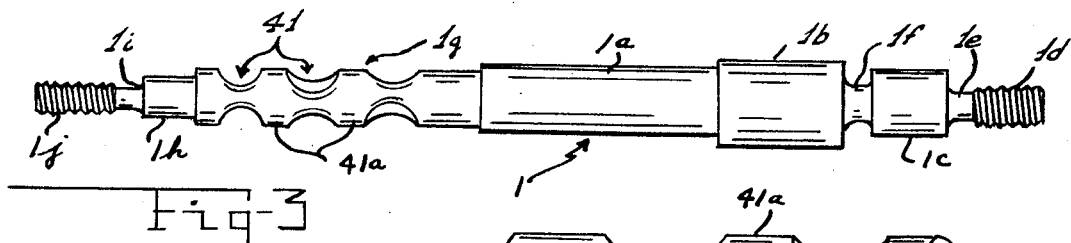
FIGS. 3 and 3a, respectively, represent partly schematic and/or broken-away views of the improved displacer rod of the present invention, which is to be used in place of the previously-developed displacer rod illustrated in FIG. 2.

Referring generally to the drawing and, in particular, to FIG. 1 thereof, the cryogenic compressor unit or cryogenerator compressor in which the present invention is used is illustrated generally at 30 as consisting, in part, of a compression cylinder portion 31, a heat exchanger section at 32 bolted, or otherwise attached, to said compression cylinder 31, a vacuum chamber housing 33 (shown partly broken-away) attached, as shown, to said heat exchanger section 32 and forming the vacuum chamber at 33a, a combined first and second stage displacer piston housing 34, and the "cold finger" at 35. The aforesaid combined first and second stage displacer piston housing 34 consists of an upper, relatively elongated and narrow piston housing portion 34a and a lower, relatively enlarged and shortened piston housing portion 34b which is integrally joined, as shown at the point indicated at the arrow marked "34c," to a reduced inside diameter portion of the vacuum chamber housing 33, as is indicated at 33b. As is clearly seen in said FIG. 1, with this arrangement of a reduced-inside diameter at 33b, the remaining portion of said vacuum chamber housing 33 forms with the lower, relatively enlarged piston housing portion 34b, a relatively reduced size chamber portion extending to the position where the combined displacer piston housing 34 is reduced in diameter at the juncture between the upper and lower piston housing portions 34a and 34b, from which position the vacuum chamber 33a extends with a greatly increased diameter to the uppermost extent (or to the left as viewed in FIG. 1).

The above-mentioned combined first and second stage displacer piston housing 34 encloses the first and second stage displacer pistons, indicated at the reference numerals 3 and 1, respectively. As clearly illustrated, displacer pistons 3 and 1 are each made of a similar configuration; that is, of appropriate size and shape relative to the said combined housing 34 in order to be accommodated in proper, relatively close-fitting manner therewithin. Said first and second stage displacer pistons 3 and 1 are further respectively interconnected by means of the new and improved connecting elements of the present invention. These connecting elements consist of the unique displacer piston tie rod at 2 and the displacer rod at 4.

Initially, the displacer rod used in the aforementioned compressor unit consisted of a thin, stainless steel wire brazed assembly of the type illustrated generally at 36 in FIG. 2. This displacer rod assembly 36 is shown as comprising an outer housing 37 in which is enclosed the thin, stainless steel wire at 38. Housing 37 was equipped with appropriately sized screw-threaded, opposite end portions at 37a and 37b, respectively, which are utilized to mount the piston in its proper position within the compressor unit. The stainless steel wire 38 was made with an 0.035 inch diameter and, in service, frequently broke at its brazing juncture with the inside diameter of the passage provided therefor within said outer housing 37, as is indicated at the arrow marked 39 in the aforesaid FIG. 2. Another point of frequent failure occurred at the housing thread neck portion, indicated at 40, which, due to design limitations, was made in one form with an 0.085 inch diameter. Since it was determined that the brazed wire assembly was useful to compensate for lateral misalignment frequently occurring during the assembly of the piston rod to the compressor unit, as well as that occurring during actual operation, the significant improvement of the present invention was developed, as will be hereinafter described in detail, particularly in connection with FIGS. 3 and 3a of the drawing.

Figure 3A:
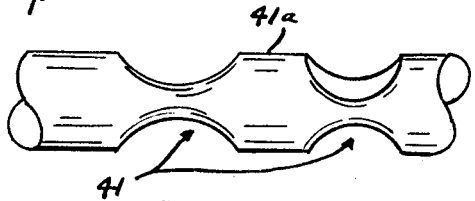

With specific regard to the above-mentioned FIGS. 3 and 3a, the unique displacer rod of the present invention is indicated generally at the previously-noted, reference numeral 1 and may consist of an 18% nickel maraging steel bar comprising a relatively smooth elongated section at 1a of approximately 0.120 inch in diameter and 2¾ inches in length, a first relatively enlarged, smooth portion a 1b of about 0.1714 inch in diameter and ¾ inch in length, a second relatively reduced smoth portion at 1c of approximately 0.140 inch, and a first screw-threaded, end portion at 1d with consecutively reduced neck portions at 1e and 1f, respectively, integrally formed between said end portion 1d and said second reduced smooth portion 1c and said first, reduced smooth portion 1b. Extending in the opposite direction of the said relatively smooth elongated, steel bar section 1a is the flexure groove bar portion 1g which forms the key feature of the present invention.

As seen particularly in the aforesaid FIGS. 3 and 3a, the aforementioned flexure groove bar portion 1g incorporates a plurality of grooves indicated generally at 41. As seen specifically in the aforesaid figures, each of said flexure grooves 41 consists of an identical pair of grooves cut out of the surface of the steel bar portion 1g on opposite sides of the longitudinal centerline thereof. Moreover, each respective pair of the grooves 41 are arranged at a 90° offset angular relation relative to each other and are alternately disposed along the surface of said steel bar portion 1g with stiffener bar portions, indicated generally at 41a, which are alternately disposed therebetween, as noted above, to thereby limit the flexure in the bar provided by the inventive flexure grooves 41 and at the same time ensure that the same is of more than sufficient strength to successfully resist the loads to be applied thereto during operation, and thus increase the resistance of the inventive grooved arrangement to fatigue failure. In this regard and to further enhance the flexibility of the displacer rod 1 to lateral misalignments in all directions, particularly in view of its relatively long configuration, the aforesaid flexure grooves 41 are each disposed along the surface of the steel bar portion 1g at a 120° angle relative to each other. Also, in one design, the curvature forming each groove 41 may consist of an arc or portion of a circle having a diameter equal to ⅜ of an inch. Furthermore, the outer end section of the steel bar portion 1g, opposite from the element 1d, incorporates or terminates in a reduced-diameter smooth end section 1h, another threaded neck portion 1i and, finally, in second screw-threaded end portion 1j which, together with the first mentioned screw-threaded end portion 1d formed on the opposite end of said displacer rod 1, facilitates the installation of the said rod in the compressor unit 30.

Figure 4:
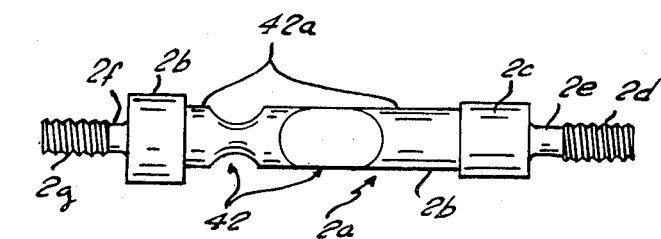
FIGS. 4 and 4a, respectively, represent schematic and/or partly broken-away views, similar to FIGS. 3 and 3a, and illustrating details of the inventive displacer piston tie rod used as part of the overall assembly view of the compressor unit of FIG. 1 and with the improved configuration of the present invention shown applied thereto.
Figure 4A:
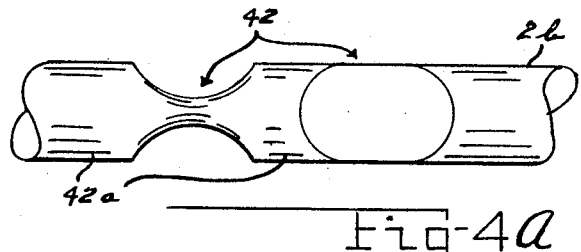
Figure 5:
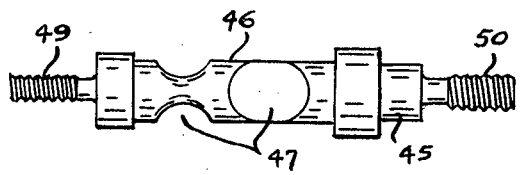
FIG. 5 is still another partly schematic view, illustrating a slightly modified form of the tie rod of FIGS. 4 and 4a, shown with a spacer bushing installed thereto.

Referring particularly to FIGS. 4 and 4a of the drawings, the inventive flexure groove arrangement is also shown applied to the displacer piston tie rod 2. In this connection, a series of two such flexure grooves are incorporated along the surface of the relatively short tie rod 2, as is shown generally at 42. Again, the flexure grooves 42 are incorporated in matching pairs which are disposed at a 90° offset angular relation to each other along opposite sides of the longitudinal center line of the tie rod 2, with stiffener sections at 42a, disposed in alternate relation thereto, which stiffener sections 42a perform the same function as previously-described for the stiffener sections 41a used in the displacer rod 1. Also, tie rod 2 may likewise consist of an 18% nickel maraging steel bar, which is indicated generally at 2a, as including a first relatively reduced, smooth bar portion 2b, a second, relatively enlarged smooth bar portion 2c, and a first screw-threaded portion formed on one end thereof, as illustrated at 2d, which is integrally formed with said bar portion 2c by means of the interconnecting reduced neck portion at 2e. To the opposite side of the last flexure groove and stiffener section at 42 and 42a, respectively, is further formed a second, relatively enlarged smooth bar portion at 2f which integrally joins with a second, screw-threaded end portion 2g on the opposite end by means of another reduced neck portion at 2h. To complete the finishing of the flexure grooves 41 and 42, respectively formed in the surfaces of both of the aforesaid displacer piston tie rod 2 and the displacer rod 4, each of the said grooves are polished to remove all scratches, and then the entire units may be heat treated at a temperature of 900° F. for three hours and thereafter air cooled. Furthermore, a spacer bushing may be utilized on the displacer piston rod or tie rod, as shown at 45, for example, in the modified tie rod 46 of FIG. 5, to thereby provide means for adjusting the overall length thereof to that desired for proper operation. Tie rod 45 is otherwise identical to the tie rod 2 of FIGS. 4 and 4a and, as such, likewise incorporates the plurality of flexure grooves indicated at 47, and the opposite, screw-threaded end portions at 49 and 50, respectively.

Again referring to FIG. 1, the previously-described displacer piston tie rod 2 and displacer rod 4 are installed in the cyrogenerator compressor 30, respectively, to first and second stage displacer pistons 3 and 1 by means of the previously-described screw-threaded portions incorporated on opposite ends thereof. The displacer rod 4 is further slidably supported in correct position within the compressor 30 by means of the heat exchanger bushing at 5, and the piston head bushing at 6, which is retained in position by the snap ring 7, and sealed by the O-ring 8 to the piston assembly 9. The operating mechanism, and supporting elements therefor, of the instant compressor 30 includes a motor, indicated in broken-away and schematic form section at 43, the motor rotor drive shaft 44, the rotor shaft bearing 25, counterweight 24, the connecting rod bearing and connecting rod, indicated respectively at 21 and 22, and the connecting crank pin 9. Further drive and driven mechanism involved in the present system comprises the displacer rod crank pin bushing and displacer rod drive link at 18 and 16, respectively, and the cross head slide, slider bushing, and bushing, respectively indicated at 13, 14, and 15, the displacer rod bushing 12, wrist pin 11 and wrist pin bushing 10. The driven mechanism for the aforesaid displacer rod 4 still further includes the displacer rod crosshead at 27 which is retained adjacent the end portion of the displacer rod 4 by means of the elastic stop nut 26. With the foregoing mechanism, actuation of the motor 43 will effect operation of the first and second stage displacer pistons 3 and 1 through means of their interconnecting elements; namely, the displacer rod 4 and the displacer piston tie rod 2, both of which incorporate the unique and novel flexure groove arrangement of the present invention, which provides equal compensation to lateral misalignments occurring either during assembly of the component parts of the present compressor, and/or during the actual operation thereof.

Since the improved flexure groove arrangement of the present invention has an inherent choking effect, the flow of heat along the displacer rod 4, for example, is not anticipated to be any greater than that involved with the originally-designed 0.035 inch diameter wire and is, perhaps, even less. Also, the displacer piston tie rod 2 would also be expected to considerably restrict any heat flow between the first and second stage displacer pistons 3 and 1 for the reason that the cross-sectional area thereof with the flexure groove arrangement of the present invention is only one-sixth of the original area without the groove arrangement.

In order to produce a temperature of 20° Kelvin at the cold finger 35 (FIG. 1), helium gas is used as the cryogen operating on the so-called "Stirling cycle." This gas is compressed and expanded through the first and second stage displacer pistons 3 and 1, or what are otherwise called "regenerators." The latter consist of small capillary-type passages incorporated in the said pistons. Any foreign debris of any amount or kind, or any lubricant or grease used will find its way into, and restrict the gas flow through the regenerators, that is, the gas flow through the said pistons 3 and 1, and thereby reduce the total efficiency to a significant degree. This problem is obviated in the present cryogenerator compressor development by the use of unlubricated ball bearings in place of the original ball bearings supplied for utilization at the previously-noted connecting rod bearing 21 and motor rotor shaft bearing 25 (note FIG. 1). With the use of such unlubricated bearings at 21 and 25, for example, a substantial improvement in operating capability is obtained. These unlubricated bearings, as at 21 and 25, are not further shown nor described herein, since they are being processed by improved means that will be set forth hereinafter in succeeding patent applications.

Although the invention has been shown and described with particular reference to a preferred embodiment, it it apparent that either modifications or changes may be made therein without departing from the true spirit or scope of the invention, as defined in the accompanying claims.

I claim:

1. In a cryogenerator compressor; a main drive motor; a motor-drive shaft driven by said motor; driven-means interconnected with, and driven by said driveshaft; a first stage displacer piston; first, screw-threaded interconnecting means attached between said first stage displacer piston and said interconnecting driven-means for thereby oscillating said first stage displacer piston on operation of said main drive motor; and second, screw-threaded interconnecting means attached between said first and second stage displacer pistons for thereby simultaneously oscillating said second stage displacer piston therewith; said first and second, screw-threaded, interconnecting means each having a semi-rigid, main casing member adapted to partially flex under load to thereby counteract lateral misalignments occurring both during the assembly of said casing member and actuation of said first and second stage displacer pistons by operation of said main drive motor.

2. In a cryogenerator compressor as in claim 1, wherein each of said semirigid, main casing members is incorporated within a thin-wire, brazed assembly and includes a series of alternately-disposed relatively reduced, thin diameter flexure portions and relatively enlarged, stiffener portions to simultaneously increase the resistance thereof to flexure from lateral misalignments and further provide additional strength and thus resistance to fatigue failure in said assembly.

3. In a cryogenerator compressor as in claim 1, wherein each of said semirigid, main casing members incorporates a series of flexure grooves disposed at predetermined angles of orientation relative to each other to thereby ensure equal compensation to lateral misalignments occurring in the assembly in all directions.

4. In a cryogenerator compressor as in claim 1, wherein each of said first and second, screw-threaded interconnecting means comprises a relatively thin, stainless steel wire brazed assembly having an outer housing member incorporating a plurality of spaced flexure grooves in alternately-oriented position thereon and at least one spacer bushing element therealong to provide for the correct oscillatory movement of each of said first and second stage displacer pistons.

5. In a cryogenic compressor as in claim 4, wherein said outer housing member incorporates a main relatively smooth and enlarged diameter portion having a first screw-threaded piston interconnection portion on one end thereof, and a second relatively reduced diameter portion incorporating said plurality of flexure grooves and terminating a second screw-threaded, piston-interconnecting portion on the other end thereof.

6. In a cryogenic compressor as in claim 5, wherein said plurality of flexure grooves comprises a series of matching pairs disposed on opposite sides of the longitudinal centerline of said outer housing member and with each of said pairs of matching grooves being further disposed at a predetermined angle of orientation relative to each other to thereby ensure equal flexure in, and thus equal compensation against, lateral misalignments occurring in any direction.

7. In a cryogenerator compressor as in claim 6, wherein said outer housing member further comprises a series of relatively enlarged diameter, stiffener sections alternately disposed relative to said matching pairs of flexure grooves to thereby provide increased strength against fatigue failure occurring in said member during operation of said first and second stage displacer pistons.

References Cited

UNITED STATES PATENTS

| 1,158,030 | 10/1915 | Dechamps | 230—183 |
| 2,670,877 | 3/1954 | Logue | 103—168 |
| 3,320,861 | 5/1967 | Johnson et al. | 92—84 |

FOREIGN PATENTS 175,655   8/1953   Austria.

HENRY F. RADUAZO, Primary Examiner

U.S. Cl. X.R.

74—581; 92—84; 417—415